Nov. 20, 1934.   J. B. MILLER   1,981,460
CABLE CONNECTER
Filed Aug. 7, 1929   2 Sheets-Sheet 1
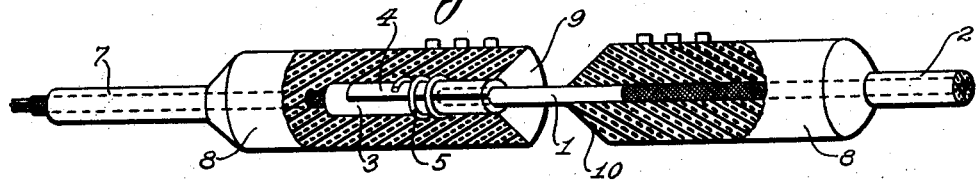
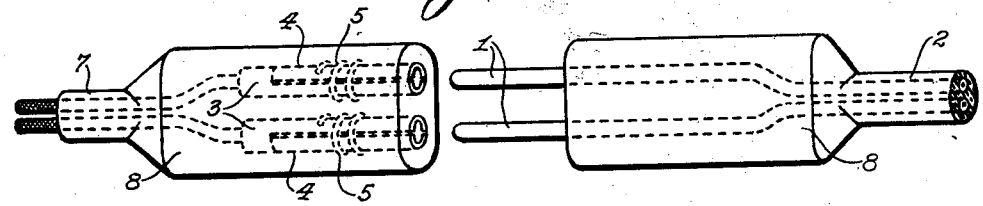
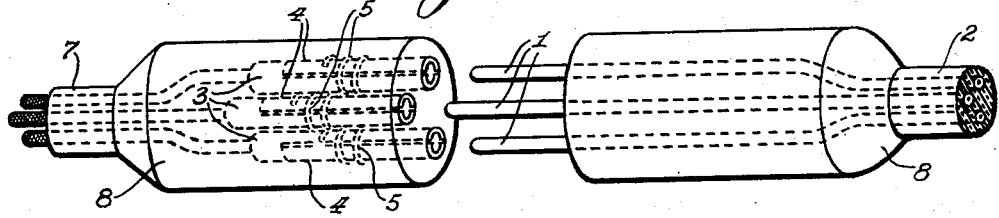
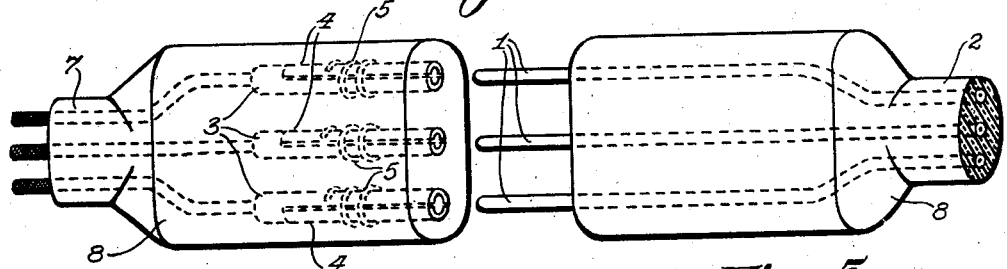
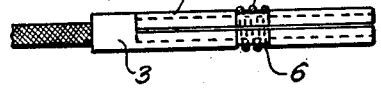
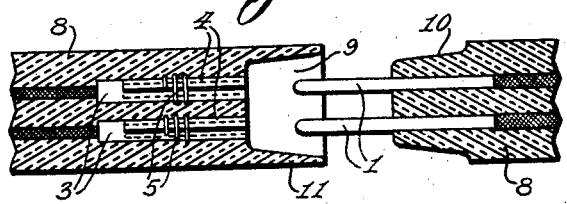
Inventor:
JAMES B. MILLER,
By John H. Bruninga
His Attorney.

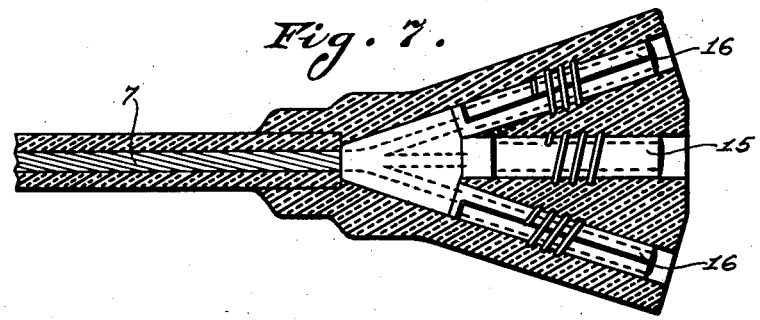
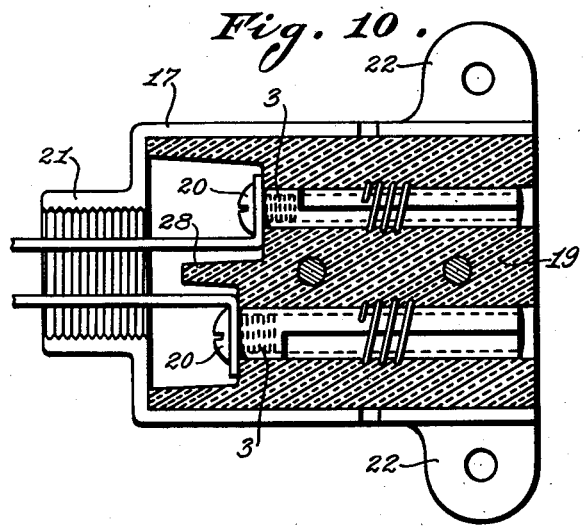
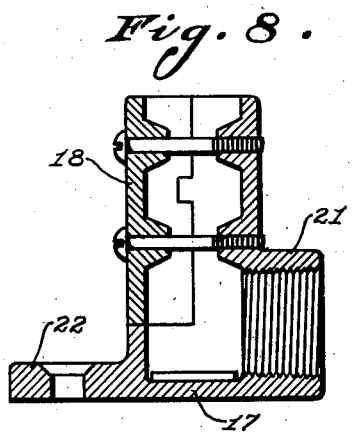
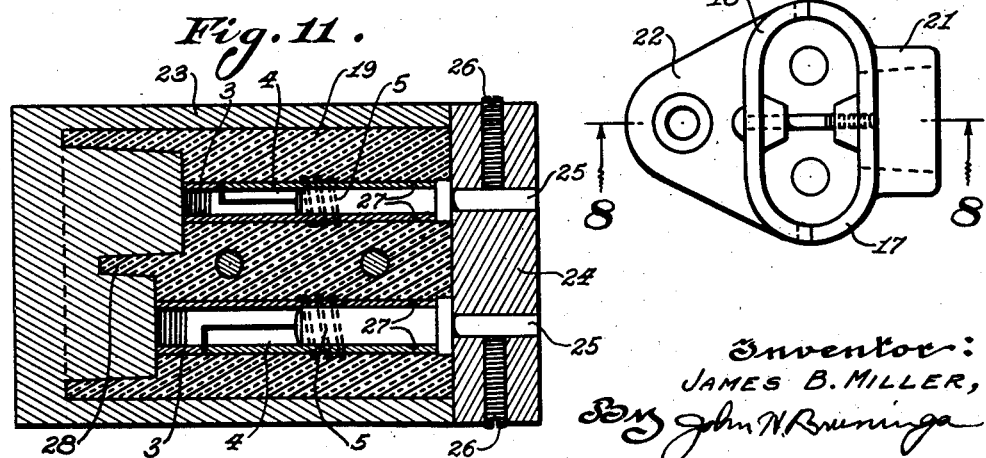

Patented Nov. 20, 1934

1,981,460

UNITED STATES PATENT OFFICE 1,981,460

CABLE CONNECTER

James B. Miller, Webster Groves, Mo.

Application August 7, 1929, Serial No. 384,193

6 Claims. (Cl. 173—332)

This invention pertains to cable connecters such as are used for making temporary electrical connections between cables or other electrical conductors.

One of the objects of this invention is to provide a connecter by means of which a connection may be made easily and in a simple manner, which will securely hold the cables in their connected positions.

Another object is to provide such a connecter which will make a good electrical contact capable of carrying a large current even though the connecter itself is relatively small in size.

Another object is to provide such a connecter by means of which a waterproof connection may be made capable of protecting the connecting parts in damp or wet places.

Another object is to provide such a connecter which when connected will have its current carrying parts completely insulated against accidental contact therewith from the outside.

A further object is to provide such a connecter which may be constructed as a multiple conductor connecter so that a two conductor or three conductor cable or the like may be connected at one operation.

Further objects will appear from the following description taken in connection with the accompanying drawings in which:

Fig. 1 is a view partly in section illustrating a connecter embodying this invention;

Fig. 2 is a perspective view illustrating the connecter as applied to a two conductor cable;

Fig. 3 is a similar view illustrating its application to a three conductor cable;

Fig. 4 shows another way of arranging the three conductor cable.

Fig. 5 is a detail of a socket;

Fig. 6 is a sectional view illustrating the application of the waterproofing feature to a two or three conductor cable;

Fig. 7 is a sectional view showing a socket arranged for branch circuits;

Fig. 8 is a sectional view of a base or floor socket embodying this invention, taken on line 8—8 of Fig. 9;

Fig. 9 is a plan view of Fig. 8;

Fig. 10 is a transverse section of a wall socket embodying this invention; and

Fig. 11 is a transverse section of a mold illustrating the molding process of this invention.

Referring to the drawings the connecter comprises a plug member 1 which may be a simple rod of brass or the like preferably rounded at its tip and soldered or otherwise electrically and mechanically connected to a conductor 2. A socket member 3 is formed of a simple tube of brass or other suitable conducting material. This tube has cut from it a side portion 4. This may be done by sawing the tube lengthwise and then transversely so as to separate the portion 4 entirely from the rest of the socket. The two portions of the socket may also be separately cast so as to fit together or any other suitable method of construction may be followed. The two parts of the socket 3 are placed in assembled relation as illustrated in Figs. 1 and 4, and are then surrounded by an elastic band such as a spring 5 so as to secure them together in a resilient manner. In order to maintain the alignment of the parts 3 and 4 a groove or depression 6 may be formed around the middle portion of the socket so as to provide projecting shoulders to retain the spring 5 which in turn retains the parts 3 and 4 in alignment.

By this arrangement the side portion 4 is loosely mounted on the portion 3 so as to be movable thereon, but is at the same time resiliently secured thereto. The connection is made by inserting the plug member 1 into the socket member 3, as illustrated in Fig. 1. In order to insert the member 1 the part 4 must be displaced laterally from the part 3 and in order to do this the tension of the spring 5 must be overcome. When the plug is completely inserted the part 4 is free to assume a bearing on the plug member throughout its length. Thus a very good electrical contact is made. The socket 13 is soldered or otherwise mechanically and electrically connected to a conductor 7 forming a continuation of the circuit.

In order to provide a waterproof joint one of the coverings 8 may be provided with a concave socket 9 at its end while the other member is formed with a corresponding convex end 10. The surfaces 9 and 10 are formed to fit one another so that when the plug member is inserted in the socket these two surfaces will be brought into contact. By twisting the two members relatively to each other the surfaces 9 and 10 may be forced into contact with one another under considerable pressure. Accordingly as this covering is of soft rubber the pressure will provide such intimate contact between these surfaces as to seal the same against the entrance of water. In fact these connecters have been used in such damp places as mines, where they have actually been allowed to lie in the water and have protected the connecter from the entrance of any water.

Fig. 6 shows the application of this feature to a multiple conductor connecter in which the parts cannot be twisted relatively to one another. In this construction the concave portion 9 is formed with an extended lip or flange 11 and the convex portion 10 is shaped accordingly, so that when the parts are forced together the flange 11 will be stretched by the wedge action of the portion 10 so as to make intimate pressure contact therewith.

In Fig. 7 a socket is shown arranged for connecting branch circuits to a main circuit. The figure shows a section taken through one terminal of a pair, the socket being provided with two or more similar terminals each consisting of a main socket 15 and two branch sockets 16. The sockets in each case are constructed as shown in Fig. 5. The main sockets 15 are for receiving corresponding plug terminals of the main circuit. Plug terminals for branch circuits may then be inserted in the sockets 16. All three sockets belonging to each terminal are connected to the same conductor 7 as shown in Fig. 7.

Figs. 8, 9 and 10 illustrate the manner in which this invention may be applied to stationary base or wall sockets. Figs. 8 and 9 illustrate a base socket while Fig. 10 illustrates a wall socket.

In either case a base or housing 17 is provided with a removable cap or cover 18 and is adapted to receive a plug 19 of rubber or the like in which one or more sockets 3 are embedded as previously described. In the embodiments of Figs. 8, 9 and 10 the sockets are not permanently connected to the conductors which lead to them but are arranged to have conductors connected thereto by means of screws 20 or other fastenings. These connections may be separated by a rubber partition 28. Accordingly the base 17 may be provided with a fitting 21 for connection to a conduit. Ears 22 may also be provided for screwing the base 17 to any suitable support.

In these embodiments the plug 19 with its sockets 3 is removably mounted in the casing so as to be capable of easy manipulation in making the connections thereto. When the connections have been made the plug is placed in the casing and the cap put into place thereover, the latter being held in place by screws 22 or other suitable fastenings.

In making the plug 19, the sockets 3 should be located therein fairly accurately as to their spacing so that plug terminals may be used therewith interchangeably. In order to secure accurate spacing of the sockets the method illustrated in Fig. 11 has been devised. In this figure, 23 represents the mold or matrix in which the plug is formed. A base block 24 is provided which closes the end of the mold. Mounted in the base block 24 is a pair of pins 25. These are secured in the base block by means of set screws 26. Each pin is made of such a size that when the socket 3 is slipped thereon it will fit in such a way as to hold the socket in its proper position in the mold. In order to securely hold the socket in place, a pair of small studs 27 is provided on each pin 25 to engage corresponding recesses on the interior surface of the socket member 3 and the loose section 4. This holds the socket accurately located in the mold so that the rubber may be formed therearound without fear of dislocating the sockets.

When the mold has been completed, the screws 26 are loosened and the block 24 removed leaving the pins 25 in the sockets 3. The entire block 19 may then be removed from the mold.

The studs 27 are arranged with beveled faces so that by now twisting the pins 25, the studs 27 will be worked out of their recesses so as to permit removal of the pins 25 from the sockets 3. This is easily accomplished since the socket is embedded in soft rubber and the parts may be sprung apart by the cam action of the bevel surfaces of the studs 27 in a well-known manner. Thus instead of withdrawing the pins 25 when the mold is opened the block 24 is first removed leaving the pins in place and the latter are removed separately by twisting to disengage the studs 27.

It will be seen, therefore, that this invention provides an electrical connecter which is capable of making a secure contact both electrically and mechanically. The pressure of the socket portion upon the plug is strong and considerable area of contact is provided. Accordingly not only is the electrical contact surface ample for carrying a large current but the friction with which the plug is held in the socket is considerable so that the parts are not easily pulled apart. In fact the friction is sufficient so that the matching surfaces 9 and 10 can be forced into contact with each other with considerable pressure without pulling the plug from the socket. As the coverings 8 are of soft rubber the pressure between the surfaces 9 and 10 or 10 and 11 provides an intimate contact which is an effective seal against the entrance of water.

The invention may be applied to many different types of terminals where it is desired to have a separable connection such as a plug and socket connection. Branch circuits may be provided for as in Fig. 7 and conduit fittings of all kinds may be provided with sockets or plugs mounted therein. As indicated in Fig. 10 a large and a small socket may be used together with plug terminals of corresponding sizes so that the plug may be inserted in the socket in only one position in order to maintain the correct polarity in the circuit controlled. By simple molding process the sockets may be accurately supported so that interchangeable plugs may be used.

It will be understood, of course, that the water-tight construction of Fig. 6 may be applied to any of the embodiments illustrated in the drawings.

While the connecter has been described as a unitary device, it will be understood, of course, that some features may be useful without the entire combination and that the employment of such sub-combinations is contemplated by and is within the scope of the appended claims. It is further obvious that various changes may be made in details of construction, within the scope of the appended claims, without departing from the spirit of this invention; it is, therefore, to be understood, that this invention is not to be limited to the specific details shown and/or described.

Having thus described the invention what is claimed is:

1. A cable connecter, comprising, a plug member, a socket member having a side portion thereof entirely separate therefrom, and means loosely supporting said side portion on said socket member, each of said members being enclosed in an insulating covering, and said coverings having matching end portions mutually engageable to provide a water-tight joint.

2. A cable connecter, comprising, a plug member, a socket member comprising a tube having a side portion thereof cut therefrom and resiliently secured thereto, each of said members being enclosed in an insulating covering, and said coverings having matching end portions mutually engageable to provide a water-tight joint.

3. A cable connecter, comprising, a plug member, a socket member comprising a tube having a side portion thereof cut therefrom and resiliently secured thereto, each of said members being enclosed in an elastic insulating covering, and said coverings having matching end portions adapted for resilient engagement to provide a water-tight joint.

4. A cable connecter, comprising, a plug member, a socket member, comprising a tube having a side portion thereof cut therefrom and resiliently secured thereto, each of said members being enclosed in an elastic insulating covering, and said coverings having concave and convex matching end portions adapted for resilient engagement, one within the other, to provide a water-tight joint.

5. A cable connecter, comprising, a plug member, a socket member, comprising a tube having a side portion thereof cut therefrom and secured thereto by a spring surrounding said tube and said portion, each of said members being enclosed in an elastic insulating covering, and said coverings having matching end portions adapted for resilient engagement to provide a water-tight joint.

6. A cable connecter, comprising, a plug member, a socket member comprising a tube having a side portion thereof cut therefrom and secured thereto by a spring surrounding said tube and said portion, each of said members being enclosed in an elastic insulating covering, and said coverings have concave and convex matching end portions adapted for resilient engagement, one within the other, to provide a water-tight joint.

JAMES B. MILLER.